(12) United States Patent
Vogt et al.

(10) Patent No.: US 10,518,978 B2
(45) Date of Patent: Dec. 31, 2019

(54) TRANSFER DEVICE FOR TRANSFERRING ARTICLES

(71) Applicant: BLEICHERT AUTOMATION GMBH & CO. KG, Osterburken (DE)

(72) Inventors: Rainer Vogt, Osterburken (DE); Steffen Watzal, Osterburken (DE)

(73) Assignee: Bleichert Automation GmbH & Co. KG, Osterburken (DE)

( * ) Notice: Subject to any disclaimer, the term of this patent is extended or adjusted under 35 U.S.C. 154(b) by 0 days.

(21) Appl. No.: 16/099,119

(22) PCT Filed: May 4, 2017

(86) PCT No.: PCT/EP2017/060657
§ 371 (c)(1),
(2) Date: Nov. 5, 2018

(87) PCT Pub. No.: WO2017/191257
PCT Pub. Date: Nov. 9, 2017

(65) Prior Publication Data
US 2019/0084768 A1    Mar. 21, 2019

(30) Foreign Application Priority Data
May 6, 2016   (DE) .......................... 10 2016 108 449

(51) Int. Cl.
*B65G 23/04*    (2006.01)
*B65G 13/11*    (2006.01)
(Continued)

(52) U.S. Cl.
CPC .............. *B65G 23/04* (2013.01); *B65G 13/11* (2013.01); *B65G 65/005* (2013.01);
(Continued)

(58) Field of Classification Search
CPC .. B65G 13/11; B65G 41/005; B65G 2207/14; B65G 65/005; B65G 21/12; B65G 21/06;
(Continued)

(56) References Cited

U.S. PATENT DOCUMENTS 1,324,785 A * 12/1919 Bechtel ................. B65G 69/30
414/373
5,209,627 A     5/1993 Lisec
(Continued)

FOREIGN PATENT DOCUMENTS

DE          9104816      9/1991
DE         19513994     10/1996
(Continued)

OTHER PUBLICATIONS

German Search Report, Application No. 10 2016 108 449.2, dated Dec. 30, 2016.
(Continued)

*Primary Examiner* — James R Bidwell
(74) *Attorney, Agent, or Firm* — Dority & Manning, P.A.

(57) ABSTRACT

A transfer device for introducing and/or removing articles to a process device includes a basic frame and a conveying unit, which is supported by the basic frame and transfers or receives articles to or from the process device. The conveying unit is designed to be movably positionable in order for the transfer device to be reversibly advanced up to the process device. The conveying unit includes an output element of a magnetic coupling and is designed for reversibly coupling the transfer device to a corresponding drive element of the magnetic coupling, the drive element being provided on the process device. When the drive element and the output element are coupled to one another, the magnetic coupling effectuates a force transmission from a drive unit of the process device to the conveying unit.

21 Claims, 6 Drawing Sheets

(51) Int. Cl.
  *B65G 41/00* (2006.01)
  *B65G 65/00* (2006.01)
  *B65G 47/64* (2006.01)
(52) U.S. Cl.
  CPC .......... *B65G 41/005* (2013.01); *B65G 47/642* (2013.01); *B65G 47/643* (2013.01); *B65G 2207/14* (2013.01)
(58) Field of Classification Search
  CPC ........ B65G 23/18; B65G 23/10; B65G 23/04; B65G 23/02; B65G 23/00; B65G 1/04; B65G 65/00; B65G 13/071; B65G 43/10; B65G 69/22
  USPC .............................................. 198/860.1, 805
  See application file for complete search history.

(56) References Cited

U.S. PATENT DOCUMENTS

| | | | |
|---|---|---|---|
| 5,779,428 A | 7/1998 | Dyson et al. | |
| 6,321,900 B1* | 11/2001 | Micklethwaite | B65G 23/00 198/496 |
| 8,303,234 B2* | 11/2012 | Ezure | H05K 13/02 414/396 |
| 9,475,209 B2* | 10/2016 | Nakamoto | B24B 27/0633 |
| 2011/0170991 A1 | 7/2011 | Weigl | |
| 2013/0121802 A1 | 5/2013 | Albrecht et al. | |
| 2013/0306442 A1* | 11/2013 | Allen, Jr. | B65G 23/10 198/835 |
| 2014/0041961 A1* | 2/2014 | Sun | E04G 1/22 182/14 |
| 2019/0055093 A1* | 2/2019 | Chi | B65G 47/643 |

FOREIGN PATENT DOCUMENTS

| | | |
|---|---|---|
| DE | 102008045370 | 4/2010 |
| DE | 102012104902 | 12/2013 |
| FR | 2517649 | 10/1983 |
| WO | WO 2013/098834 | 7/2013 |

OTHER PUBLICATIONS

International Search Report (PCT/EP2017/060657), dated Jul. 20, 2017.
International Preliminary Report on Patentability (PCT/EP2017/060657), dated Nov. 6, 2018.

* cited by examiner

TRANSFER DEVICE FOR TRANSFERRING ARTICLES

CROSS-REFERENCE TO RELATED APPLICATIONS

This application claims priority to International Application Serial No. PCT/EP2017/060657, filed May 4, 2017, which claims priority to German Application No. 10 2016 108 449.2, filed May 6, 2016. International Application Serial No. PCT/EP2017/060657 is hereby incorporated herein in its entirety for all purposes by this reference.

FIELD OF THE INVENTION

The present invention relates to a transfer device for transferring articles to and/or from a process device, in particular, to a stationary conveying station and/or to a processing station, and/or to a further transfer device, for the purpose of introducing and/or removing articles, in particular, workpieces and/or workpiece carriers.

BACKGROUND OF THE INVENTION

U.S. Pat. No. 5,779,428 A, which patent is hereby incorporated herein in its entirety by this reference for all purposes, describes a carrier cart which comprises a frame including rollers, and so the carrier cart can be displaced in order to transport workpieces. The carrier cart also comprises a carrier platform including several rollers, and so the articles can be pushed onto or off of the carrier cart by an adjacent device. The disadvantage of this carrier cart is that the workpieces must be pushed onto the carrier platform by a worker, which requires a great deal of effort in some cases, which involves a correspondingly large amount of time and, therefore, costs.

The problem addressed by the present invention is that of creating a transfer device which can be coupled to a process device in an easy way and allows for an easier transfer of workpieces from the transfer device onto the process device.

BRIEF OBJECTS AND SUMMARY OF THE INVENTION

The problem is solved by a transfer device as described herein and by a system comprising a transfer device and at least one process device as described herein.

The invention relates to a transfer device which can be temporarily advanced up to at least one process device, in particular, up to a stationary conveying station and/or up to a processing station, and/or up to a further transfer device, for the purpose of introducing and/or removing articles, in particular, workpieces and/or workpiece carriers. The articles can be intermediately stored and/or transported on the transfer device according to the invention. For example, the transfer device can be pushed from one process device to another process device, and so the articles can be transported between these two process devices. The transfer device according to the invention can also be implemented as a permanently situated (or also displaceable) rotary table between process devices (for example, conveying units) or in the form of a hoist which interconnects process devices situated at different heights.

A basic frame of the transfer device supports at least one conveying unit which comprises force transmission means and conveying means. In this case, the at least one conveying unit is designed to be movably positionable together with the basic frame or relative to the basic frame. The conveying means are driven by the force transmission means which are connected to the magnetic coupling, and so the conveying means can transfer or receive the articles to or from the process device. For example, the articles can rest directly on the conveying means, and so, upon actuation of the conveying means, the articles can be transferred or received.

In order to form the magnetic coupling, the transfer device includes an output element for the reversible coupling of the transfer device to a corresponding drive element provided on said process device. With the aid of the magnetic coupling, a force transmission from a drive unit of the process device to the force transmission means of the conveying unit is made possible. The transfer device does not comprise a separate drive unit, for example, a motor, in this case. The drive unit can comprise, in this case, a separate drive provided only for the transfer device, or the drive unit is a drive which, for example, also drives at least one conveying unit of the process device. With the aid of the reversible coupling, the transfer device can be easily connected to the process device and decoupled once again, for example, in order to transport the articles to a further process device. Due to the coupling, a force transmission or a power flow is made possible via the magnetic coupling. The transfer device can therefore be designed, in particular, without a separate drive, since the force is transmitted from the drive element of the process device via the magnetic coupling to the output element of the transfer device. It is also advantageous that no mechanical connections need to be manually established in the case of such a magnetic coupling. There is no need, for example, to connect a shaft coming from the process device to the force transmission means of the transfer device.

One further advantage of a magnetic coupling is that a perfect centering of the drive element and the output element does not need to be present; torques can be reliably transmitted even in the case of slight decentering.

In the case of a magnetic coupling advantageously designed as an electromagnetic coupling, the drive element situated on the drive side comprises an electromagnet. While the output element is rotatably mounted and rotates in accordance with an operation of the drive unit of the process device, the electromagnet of the drive element of the process device is mostly designed to be stationary.

When the transfer device has been moved up against the process device and the electromagnet has not yet been switched on, a gap is formed between the drive element and the output element. When the electromagnet is switched on, a magnetic field builds up, wherein the drive element shifts axially relative to the process device and/or the output element shifts axially relative to the transfer device until—in one preferred embodiment—said gap closes and the two elements are in contact with one another (when mention is made in the following of the "elements", this means the drive element and the output element). For example, the magnetic field acts on an axially displaceable pressure plate of the drive element, wherein a frictional engagement, for example, is formed between the two elements when the two elements come into contact with one another. When the contact has been established, the rotary motion is transmitted by the drive element of the process device onto the output element of the transfer device. The two elements can also comprise toothing in order to ensure better force transmission.

The electromagnet is switched off in order to decouple the transfer device from the process device once again. With the aid of force elements, for example, springs, the drive element and the output element are retracted again in the direction of the process device and the transfer device, respectively, and so the contact is released and the gap becomes larger. The force transmission is terminated once again.

According to one alternative, the magnetic coupling can also be designed as a contactless magnetic coupling. In this case, the two elements do not have contact with one another, even during the force transmission. The force transmission is facilitated via the magnetic field of the electromagnet, wherein at least one further magnet, on which the magnetic field of the electromagnet acts, is situated on the output element for this purpose. The force transmission therefore takes place with the aid of the magnetic field, i.e., contactlessly, from the electromagnet to the at least one further magnet. Due to the contactless magnetic coupling, even more moving parts can be dispensed with. In particular, a coupling or a decoupling of the transfer device is simplified, since this merely requires that the electromagnet be switched on or off, respectively. The two elements do not need to be displaced relative to one another, for example.

A magnetic coupling is therefore particularly easy to control, wherein the electromagnet merely needs to be switched on or off, and so the force transmission can be switched on and off, respectively. For example, in order to reverse the direction of rotation or when no article is located on the transfer device, the force transmission to the transfer device can be intermittently interrupted in order to save energy.

In addition, the magnetic coupling comprises only a few moving parts, since the generation of the contact pressure between the drive element and the output element is carried out with the aid of magnetic forces, i.e., contactlessly and only by closing an electric circuit.

Advantageously, magnetic couplings can also be implemented using permanent magnets for contactless torque transmission. The couplings in this case are preferably made up of disks which are positioned opposite each other and are preferably equipped with very strong rare earth magnets. The torque which then acts on the disk of the drive element is automatically transmitted across the air gap, which is 2 mm to 3 mm, for example, to the other disk of the output element.

Magnetic couplings comprising a combination of electromagnets and permanent magnets are also conceivable.

It is particularly preferred when the basic frame, together with the at least one conveying unit, is designed to be movably positionable, in order to advance the conveying unit up to the process device and move the conveying unit away from the process device once again.

According to a corresponding, particularly advantageous embodiment, the basic frame of the transfer device is designed to be, in particular linearly, displaceable, in particular with the aid of rollers, wheels, chains, or runners. In this embodiment, the transfer device is designed as a delivery cart—also referred to as a trolley—which can be moved in a manual or motorized manner or even automatically from one process device to another process device (or another unit, in particular another delivery cart or—more generally—a transfer device).

The term "linear displacement" of the basic frame, including conveying unit(s), also encompasses a raising and lowering, in order, for example, to transport workpieces or workpiece carriers from one transport level to another, vertically offset transport level.

Alternatively or additionally, the basic frame is designed to be rotatable, preferably about a vertical rotational axis, together with the at least one conveying unit. For example, the basic frame, including conveying unit(s), can be situated on a fixed base and can be rotated about a vertical axis, and so the at least one output element can be coupled to various drive elements of various process devices, in order, for example, to enable the transport of a workpiece from one process device to a process device offset relative thereto by 90°.

According to one alternative, the basic frame is fixedly situated and the at least one conveying unit is designed to be displaceable and/or rotatable relative to the basic frame. According to one corresponding embodiment, the at least one conveying unit is designed to be vertically displaceable while the basic frame remains in its place. In this embodiment as well, workpieces or workpiece carriers can be transported from one transport level to another, vertically offset transport level.

Generally speaking, the transfer device preferably comprises lifting means. With the aid of the lifting means, in particular, a transport level of the transfer device can be adjusted, with respect to its height, relative to a transport level of the process device. The transport level of the transfer device is essentially defined, in this case, by the conveying means on which the articles rest. With the aid of the lifting means, for example, the conveying means or the conveying unit can be moved upward and/or downward with respect to the basic frame. In addition, one portion of the basic frame can be moved upward and/or downward with respect to the rest of the basic frame. In any case, the conveying means are moved, and so the height of the transport level of the transfer device can be adjusted. Therefore, for example, an unloading of the articles by a worker can be simplified. When, for example, the articles must be placed into a shelving unit, the different shelf levels of which, including their particular conveying units, can also be referred to as process devices within the scope of the invention, the height of the transport level can be adapted to the particular height of one or several of the shelves.

It is also advantageous when the transport level of the transfer device, i.e., the transport level of the at least one conveying unit, can be moved to transport levels of one or several process devices at different heights. In this case, the lifting unit can pick up articles, for example, from one transport level of the process device and raise or lower the articles to another transport level of the same (or of another) process device and, there, deliver the articles at the other transport level of the process device with the aid of the conveying unit.

One advantageous refinement with respect to the lifting means provides that the lifting means can be driven by the drive unit of the process device with the aid of the at least one magnetic coupling. For example, a vertical conveyor chain or a conveyor belt can be provided, via the magnetic coupling, for vertically moving the at least one conveying unit. The design of the transfer device is therefore simplified, since a separate drive for the lifting means does not need to be carried along on the transfer device. In a case of coupling the transfer device to the process device, a connection with the aid of the magnetic coupling is still designed according to the invention, and so only a portion of the drive force needs to be branched off from the drive unit of the process device. In this case, the force transmission means can drive not only the conveying means, but also the lifting means.

Additionally or alternatively, the lifting means can also be driven with the aid of an additional magnetic coupling, the drive elements and output elements of which, in turn, are provided on the process device or on the transfer device according to the invention, respectively. For this purpose, this additional magnetic coupling can be designed similarly to that magnetic coupling which provides the force transmission between the drive unit of the process device and the force transmission means of the transfer device. Therefore, the lifting means can be operated separately from the conveying means. When, for example, the articles are already resting on the conveying means, the conveying means can be switched off and only the lifting means can be operated with the aid of the additional magnetic coupling.

It is possible that the transfer device according to the invention is designed to be moveable exclusively in a horizontal plane or exclusively comprises lifting means for the vertical transport of articles. In the latter case, the transfer device does not necessarily require rollers, wheels, runners, rails, or the like, on the underside. Instead, the transfer device can be fixed on one or several process devices. Both displacement options, horizontally and vertically, can also be provided, of course, in particular in the form of a transfer device which is moveable in the horizontal and comprises additional lifting means for the conveying unit. In another variant (see further below), the entire transfer device is designed to be vertically displaceable.

It is particularly preferred when the conveying means of the transfer device extend between two longitudinal profiles, wherein at least one output element is provided at at least one end of one of the two longitudinal profiles. The two longitudinal profiles preferably extend in a common horizontal plane. The longitudinal profiles are preferably made of aluminum or steel.

According to one advantageous exemplary embodiment, two output elements are provided on one side of the transfer device which can be advanced up to a process device, preferably on adjacent ends of said longitudinal profiles, and so the conveying means of the transfer device can be driven with the aid of two adjacent magnetic couplings. In a simpler, more cost-effective variant, only one output element is provided on one side of the transfer device. It is also possible that one output element is provided on each of the diametrically opposed ends of the transfer device (for example, one each situated on one of the two ends of one of said profiles) or that two output elements are provided in each case.

One advantageous refinement of the invention provides that the at least one conveying unit comprises a continuous conveyor as the conveying means. One preferred embodiment in this case is a roller conveyor, the conveying rollers of which can be driven via the magnetic coupling and the force transmission means. A roller conveyor comprises, in this case, multiple shafts spaced from one another in a conveying direction of the articles, on which preferably at least two conveying rollers are situated. The shafts and, therefore, the conveying rollers of the roller conveyor can be mounted and driven, in this case, in such a way that the articles can be transported on and by the rollers in an easy way. In addition, a transport utilizing conveying rollers is ideal when the articles have a flat contact surface and/or are stored, for example, in or on a workpiece carrier.

Roller conveyors utilized as a conveying unit can be designed to be weight-dependent or weight-independent. In one variant of weight-independent roller conveyors, the roller conveyors comprise a slipping clutch including a vertical shaft as the force transmission means, which includes two bevel gears. A weight-dependent roller conveyor is designed, for example, as a friction roller track, in which a chain is driven via said magnetic coupling and the chain drives the rollers. In this case, a bevel gear can drive the pinion of the chain.

The conveying unit comprising at least one continuous conveyor can also include a chain conveyor, a belt conveyor, a modular belt conveyor, a toothed belt conveyor, and/or a slat-band chain conveyor. The conveying unit can be adapted to the requirements, in this case, for any type of articles. A chain conveyor or a modular belt conveyor can be utilized, for example, when the articles are smaller objects, for example, screws. Individual or multiple articles can also be transported on a carrier, such as a workpiece carrier which is transferred or received.

It is furthermore advantageous when the at least one conveying unit comprises at least one and preferably two longitudinal profile(s)—preferably the aforementioned longitudinal profiles—extending in the conveying direction, along which a mechanical force transmission means for the conveying means (for example, roller conveyor) extends, and an output element is situated at at least one end of at least one of these longitudinal profiles. The mechanical force transmission means can comprise, for example, a shaft for transmitting the rotary motion of the output element to the conveying means. Additionally or alternatively, the mechanical force transmission means can also comprise a chain, a drive belt, or a toothed belt which extends along the longitudinal profile and thereby drives the conveying rollers.

It is also advantageous when the force transmission means comprise a drive rod which can be set into rotation via the magnetic coupling and which thereby drive the conveying means, for example, one of the two end faces of shafts which support the conveying rollers, in a force-locked or form-locked manner. The drive rod can extend along the entire length of the transfer device in this case, and so all conveying means, which are situated along the length of the transfer device, can be driven. This simplifies the design, since essentially all conveying means can be reached with one single component. For example, a bevel gear is situated in areas of the drive rod which are associated with the conveying means, and interacts with gear wheels of the conveying means, and so a rotary motion of the drive rod can be converted into rotary motions of a plurality of conveying means in various areas of the transfer device. It is advantageous when the shafts which support the conveying rollers comprise, on their end faces, correspondingly designed gear wheels, into which the bevel gear teeth of the drive rod mesh.

Therefore, according to this advantageous embodiment, all shafts, including the conveying rollers situated thereon, can be driven directly with the aid of the force transmission means connected to the magnetic coupling. This simplifies the design, since the force transmission to the conveying rollers can be established by way of only one force transmission means.

According to one alternative, it is advantageous when the roller conveyor comprises at least one shaft (with or without conveying rollers situated thereon) which can be driven via the force transmission means, wherein other shafts, to which conveying rollers are attached, are then connected to said shaft with the aid of a belt and/or chain overdrive. This design is relatively easy to implement. Maintenance of the transfer device can also be simplified, since, if a belt and/or chain overdrive becomes damaged, only the belt and/or chain overdrive needs to be replaced.

Moreover, a system is provided within the scope of the present invention, which comprises a transfer device designed according to the preceding description, as well as at least one process device. The moveable or stationary (and then equipped, for example, with lifting means for the at least one conveying unit) transfer device, in the case of which at least the at least one conveying unit is movably positionable, is utilized for introducing and/or removing articles, in particular, workpieces and/or workpiece carriers (in or on which workpieces are stored), while the process device is designed, for example, as a stationary conveying and/or processing station. Moreover, the transfer device comprises—as described above—at least one output element as part of a magnetic coupling, the corresponding part of which includes a drive element which is situated on the process device. A force transmission from a drive unit of the process device to the force transmission means of the conveying unit is implemented with the aid of the magnetic coupling.

The process device also comprises, in this case, at least one conveying unit which preferably also includes conveying means and/or force transmission means. For example, the conveying unit of the process device comprises a continuous conveyor in the form of a chain conveyor, a belt conveyor, a modular belt conveyor, a toothed belt conveyor, and/or a slat-band chain conveyor. The conveying means of the process device can include, for example, conveying rollers.

One advantageous refinement of the system according to the invention provides that the system comprises a positioning frame for positioning the transfer device at the process device. The positioning frame preferably comprises an entry opening and lateral boundaries as well as a boundary positioned opposite the entry opening and adjacent to the process device. The positioning is simplified with the aid of the positioning frame, since the transfer device can be guided laterally, on its front side, and/or on its back side, and so, for example, the transport levels of the transfer device and of the process device can be better adapted to each other.

In addition, it is advantageous when the positioning frame is fixedly situated at or near the process device, for example, with the aid of bottom-side screw connections. Due to this fixation, the positioning frame always has the same position, and so the two transport levels of the transfer device and of the process device located at the same height are always aligned the same with respect to one another during a repeated introduction and/or removal of articles. In addition, the positioning frame therefore cannot be displaced by way of a collision with the transfer device. The transfer device therefore only ever needs to be moved into the entry opening and is then aligned at a defined point by way of the positioning frame.

It is also advantageous when the at least one conveying unit of the transfer device and at least one conveying unit of the process device comprise conveying means which are identical or equivalent and are aligned or can be brought into alignment with one another in the horizontal direction. Therefore, the two conveying units are situated at an identical height or—in particular when lifting means are provided—can be brought to the same height. In particular, the first and the second transport levels are situated or can be situated at an identical height. Therefore, the articles can be moved back and forth, after a height adjustment between the transfer device and the process device has been carried out, if necessary. In an arrangement of this type, a transition area between the two conveying units can also be overcome without any hindrances.

Moreover, it is advantageous when the system comprises a transport unit, with the aid of which the transfer device is designed to be moveable between various process devices and/or to a further unit. The transport unit can comprise rollers, rails, runners, and/or wheels in this case. Therefore, the transfer device can be guided in the transport unit, and so the transfer device can be moved between the process devices, preferably automatically and without a separate drive, with the aid of an electronic controller. Additionally or alternatively, electrical, magnetic, simple metallic and/or light lines can be installed in an undersurface, and so a sensor on the transfer device can automatically follow these lines. For this purpose, the transfer device preferably comprises a separate drive including an energy store.

It is also advantageous when the transport unit comprises a displacement unit, in particular toothed belts, toothed bars, a friction wheel drive, and/or a traction cable, and/or the transfer device comprises a separate drive, and so the transfer device is designed to be moveable in the transport unit. In the aforementioned case, one or multiple transfer devices can be advantageously coupled to the displacement unit, for example, a traction cable, and so the traction cable can be constantly driven and the transfer devices are coupled to the traction cable as necessary. Once the transfer devices have reached the desired position, they can be decoupled from the traction cable.

Additionally or alternatively, it is advantageous when the transport unit is designed to extend vertically and the entire transfer device, i.e., not only the conveying means or the conveying unit as is the case with the aforementioned lifting means, moves up and down. The transport unit is similar to a hoist for the transfer device in this case, which can transfer or receive articles to or from process devices situated at various heights. The transport unit also comprises a displacement unit in this case, which includes, for example, a traction cable. The transfer device hangs on the traction cables in this case and can be pulled upward and/or lowered downward, for example, with the aid of a winch.

BRIEF DESCRIPTION OF THE DRAWINGS

Further advantages of the invention are described in the following exemplary embodiments. Wherein.

DETAILED DESCRIPTION

Figure 1:
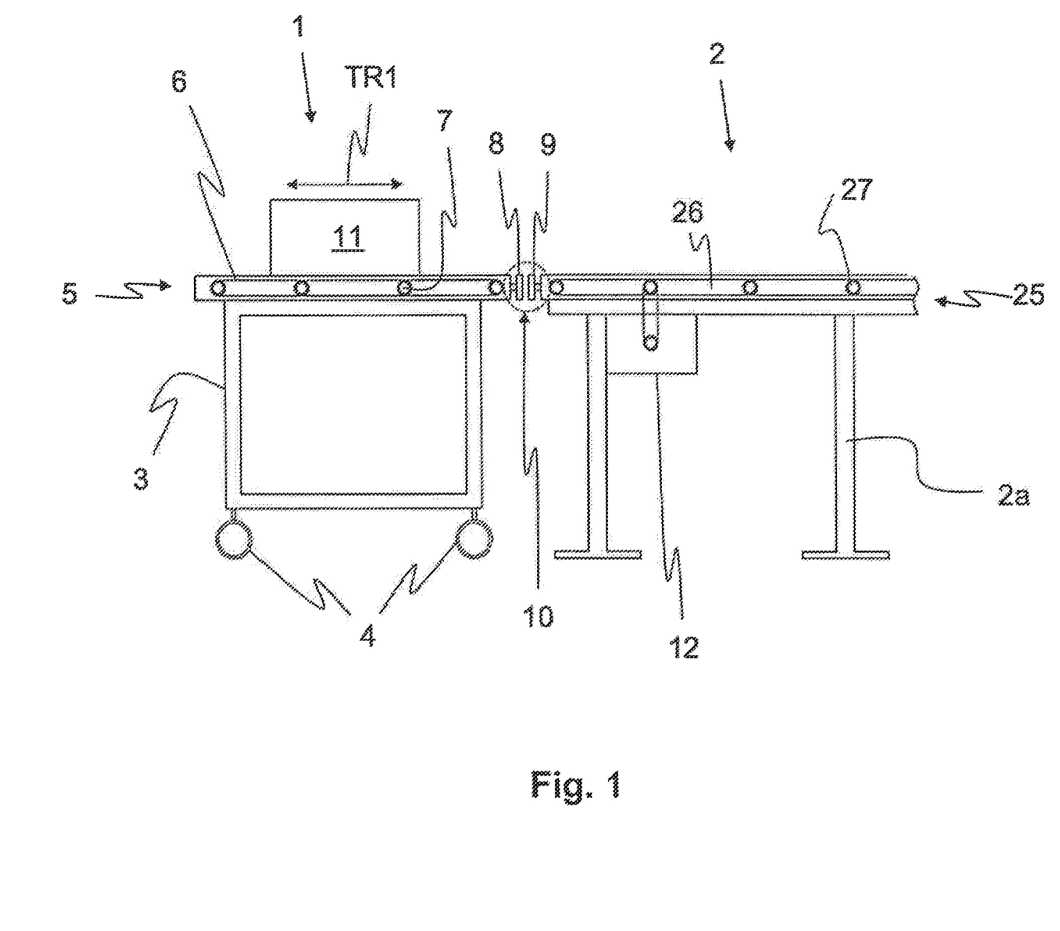
FIG. 1 shows a side view of a transfer device, coupled to a process device.
Figure 2:
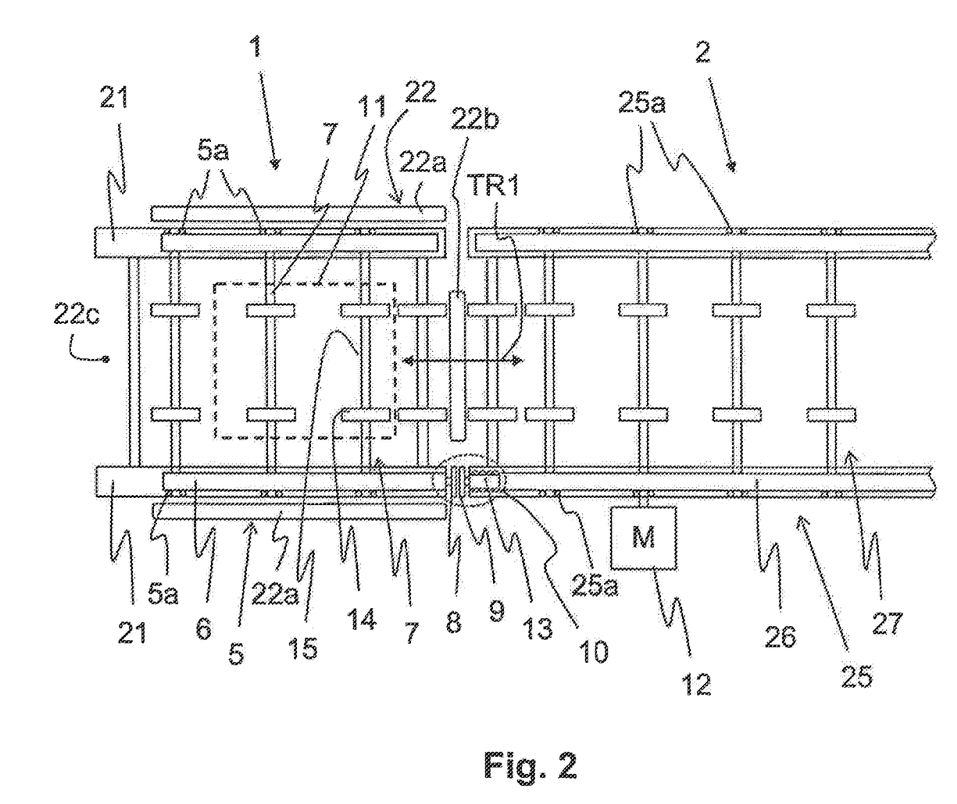
FIG. 2 shows a top view of the transfer device according to FIG. 1, coupled to a process device.

FIG. 1 shows a side view of a transfer device 1 and FIG. 2 shows a corresponding top view, wherein the transfer device 1 has been guided up to a process device 2. The transfer device 1 comprises a displaceable basic frame 3 which can be moved on rollers 4, for example, moved manually or with the aid of mechanical assistance. In this embodiment, the transfer device 1 can be referred to as a delivery cart or a trolley which can be temporarily moved up to a process device 2. In FIG. 2, a positioning frame 22 is also schematically illustrated (not represented in FIG. 1), which comprises two lateral boundaries 22a and one front boundary 22b adjacent to the process device. An entry opening 22c is provided opposite the front boundary 22b. These boundaries 22a, 22b are preferably designed as grates, walls, or similar stable planar structures which are fixedly situated, for example, with the aid of bottom-side screw connections. The boundaries 22a, 22b are utilized for the precise advance and coupling of the transfer device 1 to the process device 2.

The basic frame 3 supports a conveying unit 5 (see top view in FIG. 2) which comprises force transmission means 6 and conveying means 7. In this exemplary embodiment, the force transmission means 6 are each formed as a revolving belt, for example, as a drive belt in the form of a toothed belt or a V-belt, or a chain. As indicated here and as also shown in FIG. 2, the conveying means 7 can be designed as roller conveyors comprising conveying rollers situated on shafts, the two ends of which are accommodated in bearings 5a which, in turn, are situated in longitudinal profiles 21. One free end or the end face of these shafts is driven by the force transmission means 6 in each case. Situated on the conveying means 7 is an article 11 (represented in FIG. 2 using a dashed line) which is designed either as a single workpiece and rests directly on the conveying means 7 or has been placed into a workpiece carrier and can be transported in the transport directions TR1 with the aid of the conveying means 7. Articles 11 can be transferred to the process device 2, which is supported at a particular location by a frame 2a in this case, or can be received from the process device 2 by the transfer device 1.

In addition, the transfer device 1 comprises an output element 8 which is situated at one end of one of the two conveying units 5 facing the process device 2. A corresponding drive element 9, which is situated on the process device 2 directly opposite the transfer device 1 and at the same height as the output element 8, can be coupled to the output element 8.

Both elements, namely the drive element 9 and the output element 8, are part of a magnetic coupling 10, wherein a force transmission from a drive unit 12 of the process device 2 to the force transmission means 6 of the conveying unit 5 is made possible with the aid of the magnetic coupling 10. In this case, the output element 8 is connected to the force transmission means 6 of the transfer device 1 via force connections (not shown here), for example, via a bevel gear, a toothed belt, a V-belt and/or drive rods. In a similar way, the drive element 9 is connected to a conveying unit 25 of the process device 2 and, finally, to the drive unit 12 (represented only in FIG. 1). The conveying unit 25 comprises—similarly to the conveying unit 5—force transmission means 26, for example, in the form of a toothed belt, and conveying means 27 driven by the force transmission means 26, for example, a roller conveyor including conveying rollers. The actively and non-actively driven free ends of the conveying means 27 are rotationally mounted, in turn, in bearings 25a.

The magnetic coupling 10 also comprises, in this case, an electromagnet 13 (see FIG. 2) which is part of the drive element 9. The electromagnet 13 is connected to the process device 2 in a rotatably fixed manner in this case. A pressure plate of the drive element 9, however, can be set into rotation by the drive unit 12 in each case. A magnetic field, which acts on the output element 8 of the conveying unit 5 of the transfer device 1, can be built up with the aid of the electromagnet 13. In particular, the magnetic field can act in an attracting manner across a gap between the two elements 8, 9, and so the drive element 9 moves away from the process device 2 toward the output element 8 until the distance between the two elements 8, 9 has been overcome and the two elements 8, 9 are in contact with one another. The rotating pressure plate of the drive element 9 transfers this rotary motion to the output element 8 with the aid of a frictional engagement, for example. The two elements 8, 9 can also be toothed in order to support the force transmission. Overall, a force transmission from the drive unit 12 to the force transmission means 6 is formed in this way. Such a magnetic coupling 10 is also referred to as an electromagnetic coupling.

Additionally or alternatively, the output element 8 can also move away from the conveying unit 5 toward the drive element 9 due to the magnetic attraction.

The electromagnet 13 is particularly easily switched on and/or off in this case. When the electromagnet 13 is switched off, the two elements 8, 9 can be moved away from one another, for example, with the aid of force elements, for example, springs, which are not shown here, and so the operative connection is interrupted and the force transmission is terminated.

One further advantage of the magnetic coupling 10 is that the drive unit 12 does not also need to be switched on or off when the force transmission is switched on or off. The electromagnet 13 of the magnetic coupling 10 merely needs to be appropriately activated via the magnetic force. In particular, the electromagnet 13 does not need to have particularly high power, since the electromagnet 13 is not the actual drive unit, but rather merely establishes the operative connection between the two elements 8, 9 for the force transmission.

The aforementioned drive unit 12 can be designed, for example, as a drive motor which can drive the conveying unit 25 of the process device 2 with the aid of a toothed belt.

As shown in the top view in FIG. 2, the conveying means 7 are situated between the two longitudinal profiles 21, which extend in parallel, and can be driven with the aid of the force transmission means 6 which are provided on one of the longitudinal profiles 21. The force transmission means 6 are designed as a toothed belt in this case. The force transmission means 6 could also be designed as a driving rod, for example, which extends along the conveying unit 5.

In this exemplary embodiment, the conveying means 7 are designed as roller conveyors, wherein a design as chain conveyors, belt conveyors, modular conveyors, toothed belt conveyors, and/or slat-band chain conveyors is possible. In this example, the conveying means 7 comprise multiple shafts 15 which are spaced from one another in the transport direction TR1 and include, in each case, two conveying rollers 14 which are spaced from one another transversely to the transport direction TR1. The shafts 15 are rotatably mounted in their end areas in the bearings 5a and form an operative connection with the force transmission means 6.

According to an alternative which is not represented, two magnetic couplings 10 are provided, preferably one on each end of the two longitudinal profiles 21. Therefore, both end faces of the shafts 15 can be driven.

Figure 3:
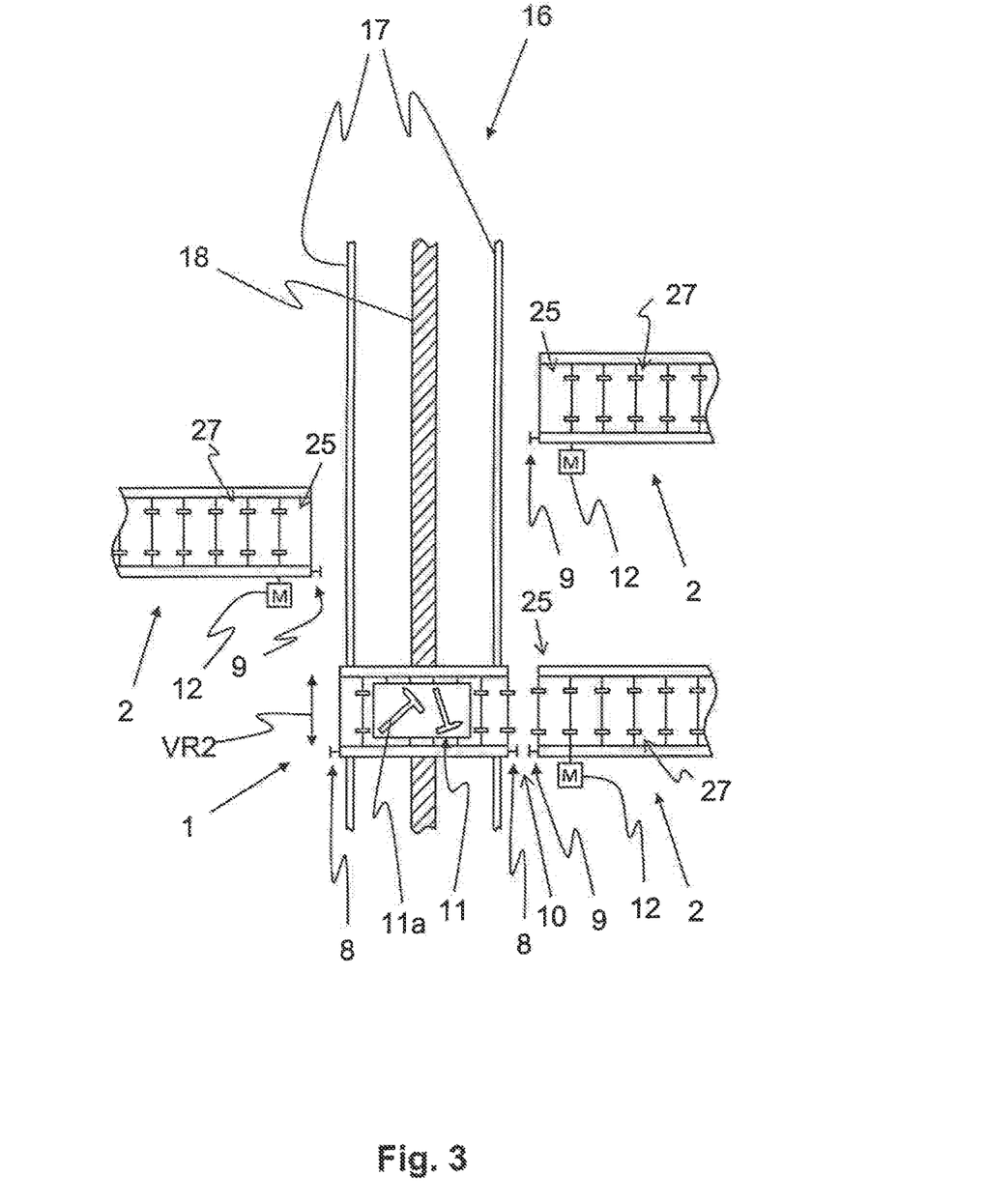
FIG. 3 shows a top view of a system comprising a transfer device, three process devices, and a transport unit.

FIG. 3 shows a top view of a system which comprises a transfer device 1, three process devices 2, and a transport unit 16. Two of the three process devices 2 are situated on one side of the transport unit 16 and the third is situated on the other side thereof. They have a common horizontal transport level for articles 11. In this exemplary embodiment, only the essential differences from the preceding figures will be discussed.

The transport unit 16 comprises two rails 17 and a displacement unit 18, and so the transfer device 1 can be displaced on the rails 17 with the aid of the displacement unit 18. The transfer device 1 comprises, for example, wheels (cf. FIG. 1) and/or runners (not shown here) in order to move on the rails 17. Additionally or alternatively, the transfer device 1 can also comprise a separate drive, with the aid of which it can be moved independently on the rails 17. The displacement unit 18 can comprise, for example, a length of chain, pull chains, a toothed belt, or the like, which act on the transfer device 1 in order to be able to move the transfer device 1 on the rails 17. Alternatively to the rails 17, the transfer device 1 can also comprise wheels which can roll directly on a foundation such as a factory floor.

Moreover, the transfer device 1 comprises an output element 8 on the opposite ends of each of the two longitudinal profiles 21 which extend perpendicularly to the rails 17. The two output elements 8 are associated with the force transmission means 6 of a conveying unit 5 (similarly to the explanations made with reference to FIGS. 1 and 2). In this case, each of the two output elements 8 of the transfer device 1, together with one drive element 9 of an adjacent process device 2 in each case, can form a magnetic coupling 10. Articles 11 (in FIG. 3, a workpiece carrier including two workpieces 11a placed therein) can then be transferred, for example, from the process device 2 to the transfer device 1. Thereafter, for example, the transfer device 1 can be moved in the displacement direction VR2 with the aid of the transport unit 16 until the transfer device 1 reaches, for example, the next process device 2 (the central process device in FIG. 3). Having arrived there, the other output element 8 of the transfer device 1 can form an operative connection with a drive element 9 of this process device 2, and so a force transmission from the drive unit 12 of the central process device 2 onto the force transmission means 6 (cf., for example, FIG. 2) of the transfer device 1 is made possible. The conveying rollers of the transfer device 1, which are driven in this way in the counterclockwise direction, transport the articles 11 from the transfer device 1 onto the central process device 2. Alternatively, further articles 11 can also be received from this process device 2, in that the conveying rollers of this process device 2 and the conveying rollers of the transfer device 1 are driven in the clockwise direction. Thereafter, the transfer device 1 can be moved, for example, to a further process device 2 (the upper process device in FIG. 3) or to the initially mentioned process device (the lower process device in FIG. 3) or to a further unit which is not shown here, in order to transfer and/or receive articles 11 there.

In an alternative exemplary embodiment, which is not represented, the process devices 2 can also be situated one above the other, in particular, at various heights or levels. Such an arrangement is formed, for example, in high-rise shelving, the individual shelf levels of which, including their conveying units, are also encompassed by the term "process device" within the scope of the present invention. The transport unit 16 extends vertically in this case and operates as a hoist, and so the entire transfer device 1 can be pulled upward and/or lowered downward. The transport unit 16 also comprises a displacement unit 18 in this case, which can be implemented with the aid of traction cables, on which the transfer device 1 is suspended. The entire transfer device 1 can be pulled upward and/or lowered with the aid of the traction cable. As a result, it is possible to receive articles 11 from various process devices 2 or transfer articles 11 to various process devices 2 at different transport levels.

Figure 4:
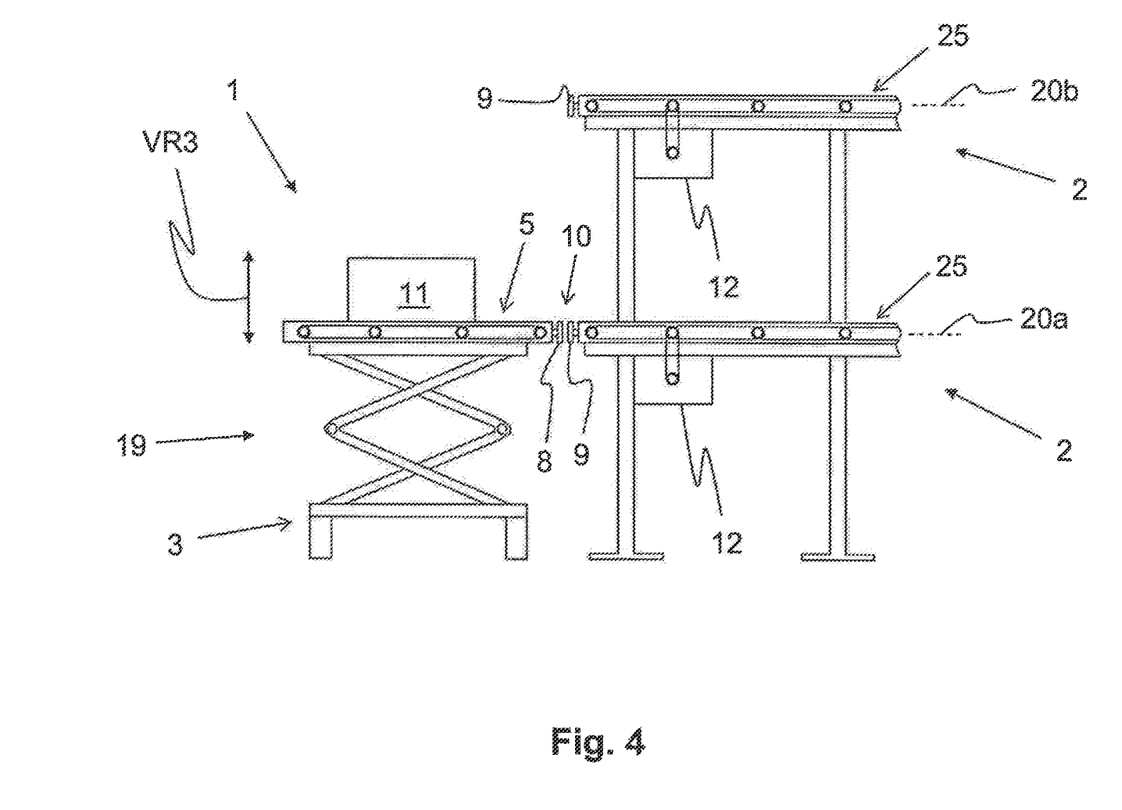
FIG. 4 shows a side view of a transfer device including lifting means, coupled to a process device.

FIG. 4 shows a side view of a similar exemplary embodiment as in FIGS. 1 and 2 comprising a transfer device 1, coupled to a process device 2. Only the essential differences from FIGS. 1 and 2 are to be discussed. The transfer device 1 comprises lifting means 19 which, in particular, can move the conveying unit 5 (possibly including parts of the frame 3) vertically up and down; see displacement direction VR3. The lifting means 19 are utilized for adapting the height of the conveying unit 5 of the transfer device 1 to the height of a transport level 20a or 20b of the process device 2, in order to be able to convey the article 11 between the transfer device 1 and the process device 2.

Alternatively or additionally, the lifting means 19 can lift and lower the conveying unit 5 to various transport levels 20a, 20b of process devices 2 situated one above the other, in order to transfer or receive articles 11 at these transport levels 20a, 20b. When, for example, two process devices 2 are situated with one directly above the other and with the same orientation (see FIG. 4), the lifting means 19 can move the conveying unit 5 of the transfer device 1 between these two process devices 2. In this way, it is possible, for example, to retrieve an article 11 from the upper process device 2 and bring it to the lower process device 2. For this purpose, the lifting means 19 merely need to move the conveying unit 5 vertically. This is ideal, for example, where at least two process devices 2 are situated one above the other and the remaining process devices are situated next to one another, in particular in one plane, as described with reference to FIG. 3, for example.

In the exemplary embodiment from FIG. 4, the lifting means 19 are designed as a scissor-type lifting table. Additionally or alternatively, the lifting means 19 can also comprise a hydraulic or pneumatic lifting unit and/or an electric drive which lifts and lowers at least the conveying unit 5 in the displacement direction VR3. The lifting means 19 are preferably supplied with the aid of an energy source carried along with the transfer device 1 in this case, and so an energy connection to the process device 2 does not need to be established. Additionally or alternatively, the lifting means 19 can also be supplied with energy from an external energy source.

Figure 5:
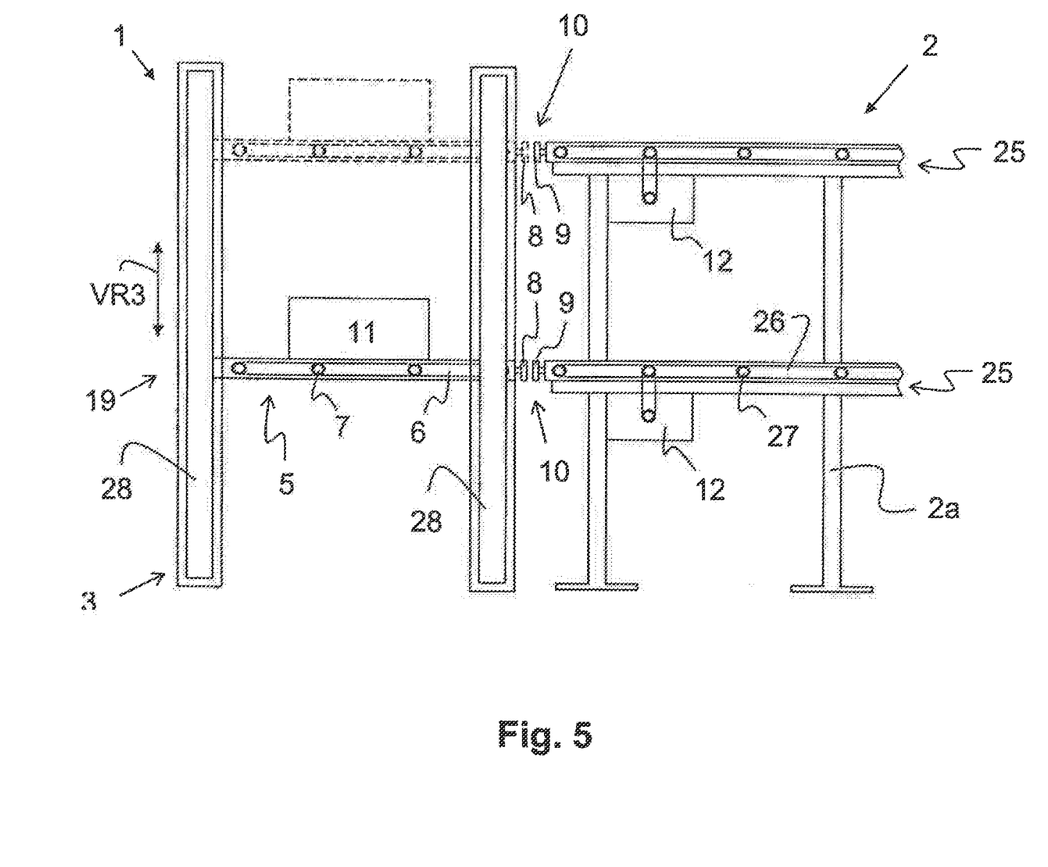
FIG. 5 shows a side view of a further embodiment of a transfer device including lifting means, coupled to a process device.

The exemplary embodiment according to FIG. 5 shows a transfer device 1, the basic frame 3 of which comprises multiple vertical posts 28, in which the conveying unit 5 is mounted and can be vertically moved with the aid of lifting means 19. For this purpose, traction cables extending, for example, in the posts 28, engage at the free ends of the conveying unit 5. With the aid of the traction cables, which are driven by a motor (the drive is not represented), the conveying unit 5 can be lifted and lowered between multiple process devices 2 situated one above the other, in order to transfer articles 11 after the activation of the magnetic coupling 10 at the particular process device 2.

In an alternative, which is not represented, the entire transfer device 1, i.e., including the basic frame 3 and the conveying unit 5, is lifted.

Figure 6:
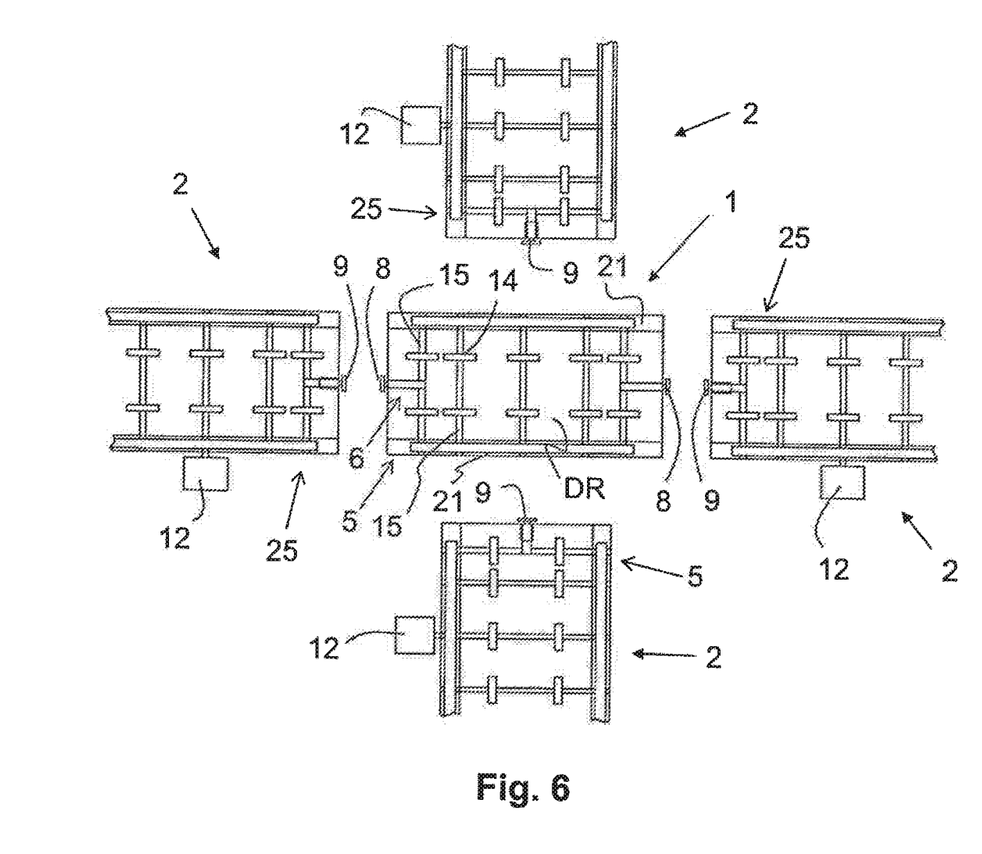
FIG. 6 shows a top view of a system comprising four process devices and one central transfer unit designed as a rotary table.

Finally, FIG. 6 shows one exemplary embodiment of a system according to the invention, comprising a rotary table designed as a transfer device 1, which, according to this example, is centrally situated relative to four process devices 2 set up in a stationary manner around this rotary table. Each of these process devices 2 is designed, in this case, for transferring articles 11 to the transfer device 1 or receiving articles 11 from the transfer device 1, after one of the two output elements 8, which are positioned opposite each other, has formed a magnetic coupling 10 with a drive element 9 of one of the process devices 2. After, for example, one or multiple articles 11 has/have been conveyed onto the transfer device 1, its conveying unit 5 is rotated about a vertical axis by 90° or 180° in the clockwise or counterclockwise direction in a direction of rotation DR on the basic frame 3 (covered in the top view) which functions as a base and is preferably stationary, in order to transfer the article or articles 11 to another process device 2, once again while forming a magnetic coupling. In the simplified representation according to FIG. 6, the output element 8 and the drive element 9 are illustrated with spacing therebetween, for the sake of clarity. It is to be emphasized, however, that the formation of the possible various magnetic couplings 10 as well as the rotatability of the transfer device 1 are possible without individual parts obstructing one another, of course. For this purpose, for example, the output element 8 and/or the drive element 9 can be designed to be telescopic, in order to reduce the spacing therebetween. In general, it is advantageous to design the output element 8 and/or the drive element 9 to be linearly displaceable, in order to bring these two elements 8, 9 closer to one another in order to enable the formation of said magnetic coupling 10, and so the elements 8, 9 engage into one another in a form-locked manner.

As is also apparent in FIG. 6, in the embodiment represented, the output element 8 and the drive element 9 are situated in the center relative to the lateral outer edges of the transfer device 1 and of the process devices 2, respectively. After a magnetic coupling 10 has been established, preferably the foremost shaft 15 of the transfer device 1, which is part of the force transmission means 6 in this case, is driven in this case. This rotational energy is transferred, for example, via drive belts which are situated on said longitudinal profiles 21, are connected to the end faces of this shaft 15, and are also part of the force transmission means 6, to the particular conveying means 7 which are located therebehind and are also designed as roller conveyors comprising conveying rollers in this case.

In principle, it would also be possible to provide only one single output element 8 on the transfer device 1. During certain processes of transferring articles 11, the transfer device 1 must then be rotated by 270°.

The present invention is not limited to the exemplary embodiments which have been represented and described. Modifications within the scope of the claims are also possible, as is any combination of the features, even if they are represented and described in different exemplary embodiments. For example, instead of an electromagnetic coupling, a permanent magnet coupling can also be utilized, given an appropriate design of the drive element 9 and the output element 8.

LIST OF REFERENCE SIGNS 1 transfer device
2 process device
2a frame of the process device
3 basic frame
4 rollers
5 conveying unit
5a bearing for conveying means
6 force transmission means
7 conveying means
8 output element
9 drive element
10 magnetic coupling
11 article
11a workpiece
12 drive unit
13 electromagnet
14 conveying rollers
15 shaft
16 transport unit
17 rails
18 displacement unit
19 lifting means
20a,b transport level
21 longitudinal profile
22 positioning frame
22a,b boundaries
22c entry opening
25 conveying unit of the process device
25a bearing for conveying means
26 force transmission means
27 conveying means
28 posts
TR1 transport direction
VR2 displacement direction
VR3 displacement direction
DR direction of rotation

The invention claimed is:

1. A transfer device for coupling to a process device, which includes a stationary conveying station and/or a processing station and/or a further transfer device, for the purpose of introducing and/or removing articles, which include workpieces and/or workpiece carriers, wherein the process device includes a drive unit having a drive element, the transfer device comprises:
   a basic frame and a conveying unit which is supported by the basic frame and includes force transmission means as well as conveying means, which is driven by the force transmission means, in order to be able to transfer or receive articles to or from said process device,
   wherein the conveying unit is designed to be movably positionable in order for the transfer device to be reversibly advanced up to the process device,
   wherein the conveying unit includes an output element that is configured to be coupled to the drive element of the process device to form a magnetic coupling that is designed for reversibly coupling the transfer device to the drive element of the magnetic coupling, wherein when the drive element and the output element are coupled to one another, then said magnetic coupling effectuates a force transmission from the drive unit of the process device to the force transmission means of the conveying unit.

2. The transfer device as claimed in claim 1, wherein the basic frame is designed to be movably positionable together with the conveying unit.

3. The transfer device as claimed in claim 1, wherein the basic frame is designed to be displaceable, preferably linearly displaceable, together with the conveying unit, in particular with the aid of rollers, wheels, chains, or runners.

4. The transfer device as claimed in claim 1, wherein the basic frame is designed to be rotatable, preferably about a vertical rotational axis, together with the conveying unit.

5. The transfer device as claimed in claim 1, wherein the basic frame is fixedly situated and the conveying unit is designed to be displaceable and/or rotatable relative to the basic frame.

6. The transfer device as claimed in claim 5, wherein the conveying unit is designed to be vertically displaceable.

7. The transfer device as claimed in claim 6, further comprising lifting means, with the aid of which the conveying unit is vertically displaceable, in particular from one transport level of the process device to another transport level of the process device or another process device.

8. The transfer device as claimed in claim 7, wherein the lifting means is designed to be connectable to said magnetic coupling and/or an additional magnetic coupling and is designed to be driven by the drive unit of the process device.

9. The transfer device as claimed in claim 1, wherein the magnetic coupling is designed as an electromagnetic coupling.

10. The transfer device as claimed in claim 1, wherein the magnetic coupling is designed as a permanent magnet coupling.

11. The transfer device as claimed in claim 1, further comprising two longitudinal profiles, wherein the conveying means extends between the two longitudinal profiles, wherein the output element is provided at one end of one of the two longitudinal profiles.

12. The transfer device as claimed in claim 1, wherein the conveying unit is selected from the group which includes the following continuous conveyors:
   roller conveyors having conveying rollers that function as conveying means which can be driven via the magnetic coupling and the force transmission means;
   chain conveyors,
   belt conveyors, or
   modular belt conveyors.

13. The transfer device as claimed in claim 1, wherein the conveying unit comprises a longitudinal profile extending in the conveying direction, on which a mechanical force transmission means for the conveying means, for example, including conveying rollers, extends, and the output element is situated on the longitudinal profile.

14. The transfer device as claimed in claim 1, wherein the force transmission means includes at least one drive rod, a chain, and/or a drive belt, which can be set into rotation via the magnetic coupling and which thereby drive the conveying means in a force-locked or form-locked manner.

15. The transfer device as claimed in claim 1, wherein the conveying unit comprises a roller conveyor, wherein either all of its conveying rollers can be driven directly with the aid of the force transmission means connected to the magnetic coupling, or at least one shaft is provided, which can be driven via the force transmission means, and other shafts are connected to said at least one shaft via a belt or chain overdrive.

16. A system, comprising:
   the transfer device as claimed in claim 1, and
   a process device that includes a stationary conveying station and/or processing station, a drive unit having a drive element, and the output element and the drive element are coupled to one another to form a magnetic coupling that transmits force from the drive unit of the process device to the force transmission means of the conveying unit.

17. The system as claimed in claim 16, further comprising a positioning frame for positioning the transfer device at the process device, wherein the positioning frame includes an entry opening, lateral boundary edges and a boundary edge positioned opposite the entry opening and adjacent to the process device.

18. The system as claimed in claim 16, further comprising an electronic controller and a transport unit, in particular rollers, rails, runners, and/or wheels, with the aid of which the entire transfer device or at least the conveying unit is designed to be movably positionable, with the aid of the electronic controller, between various process devices and/or to a further unit.

19. The system as claimed in claim 18, wherein the transport unit comprises a displacement unit for the transfer device, in particular including toothed belts, toothed bars, a friction wheel drive, and/or a traction cable, and/or the transfer device comprises a separate drive, and so the transfer device is designed to be moveable in the transport unit.

20. The system as claimed in claim 18, further comprising a displacement unit, wherein the transport unit is situated so as to extend vertically and is designed in such a way that the transfer unit can be vertically displaced with the aid of the displacement unit and/or with the aid of a separate drive and, therefore, can transfer and/or receive articles to or from transport levels, which are situated at different heights, of the process device or different process devices.

21. The transfer device as claimed in claim 1, wherein the conveying means includes conveying rollers and shafts connected to the conveying rollers and defining end faces, and wherein the force transmission means includes at least one drive rod, a chain, and/or a drive belt, which can be set into rotation via the magnetic coupling and which thereby drive the end faces of the shafts of the conveying means.

* * * * *